United States Patent
Lewis

(10) Patent No.: US 10,041,356 B2
(45) Date of Patent: Aug. 7, 2018

(54) SHOWERHEAD HOLE SCHEME APPARATUS AND SYSTEM

(71) Applicant: UNITED TECHNOLOGIES CORPORATION, Hartford, CT (US)

(72) Inventor: Scott D. Lewis, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 256 days.

(21) Appl. No.: 14/733,686

(22) Filed: Jun. 8, 2015

(65) Prior Publication Data

US 2016/0047250 A1 Feb. 18, 2016

Related U.S. Application Data

(60) Provisional application No. 62/037,955, filed on Aug. 15, 2014.

(51) Int. Cl.
  *F01D 9/04* (2006.01)
  *F01D 5/18* (2006.01)
  *F01D 25/12* (2006.01)

(52) U.S. Cl.
  CPC ............ *F01D 5/186* (2013.01); *F01D 9/041* (2013.01); *F01D 25/12* (2013.01); *F05D 2220/32* (2013.01); *F05D 2240/12* (2013.01); *F05D 2240/121* (2013.01); *F05D 2240/30* (2013.01); *F05D 2240/303* (2013.01); *F05D 2260/202* (2013.01); *Y02T 50/676* (2013.01)

(58) Field of Classification Search
  None
  See application file for complete search history.

(56) References Cited

U.S. PATENT DOCUMENTS

| | | | | |
|---|---|---|---|---|
| 5,486,093 A | * | 1/1996 | Auxier | F01D 5/186 416/97 R |
| 5,688,104 A | | 11/1997 | Beabout | |
| 6,164,912 A | * | 12/2000 | Tabbita | F01D 5/186 416/97 R |
| 6,183,199 B1 | * | 2/2001 | Beeck | F01D 5/186 416/97 R |
| 7,246,992 B2 | * | 7/2007 | Lee | B23H 9/10 415/115 |

(Continued)

FOREIGN PATENT DOCUMENTS

| | | |
|---|---|---|
| EP | 1079071 | 2/2001 |
| EP | 1645721 | 4/2006 |
| EP | 2075410 | 7/2009 |

OTHER PUBLICATIONS

Extended European Search Report dated Jan. 25, 2016 in European Application No. 15171188.4.

*Primary Examiner* — Igor Kershteyn
*Assistant Examiner* — Theodore Ribadeneyra
(74) *Attorney, Agent, or Firm* — Snell & Wilmer LLP

(57) ABSTRACT

The gas turbine component showerhead cooling hole layouts described herein include minimal lateral cooling hole exit diffusion on the middle showerhead cooling hole rows and interior facing sides of outer rows. In this way, rows of cooling holes may be placed close together. Stated another way, the outer showerhead cooling hole rows substantially only include lateral cooling hole exit diffusion in the direction away from the other rows to again allow the rows to be placed close together.

15 Claims, 11 Drawing Sheets

(56) References Cited

U.S. PATENT DOCUMENTS

| | | | |
|---|---|---|---|
| 7,789,626 B1* | 9/2010 | Liang | F01D 5/186 416/97 R |
| 8,733,111 B2* | 5/2014 | Gleiner | F23R 3/06 415/115 |
| 2006/0002796 A1* | 1/2006 | Bolms | F01D 5/186 416/97 R |
| 2006/0073015 A1 | 4/2006 | Liang | |
| 2006/0073016 A1* | 4/2006 | Liang | F01D 5/186 416/97 R |
| 2007/0140849 A1* | 6/2007 | Flodman | F01D 5/186 416/97 R |
| 2009/0169394 A1* | 7/2009 | Crow | B23H 9/10 416/96 R |
| 2014/0003960 A1* | 1/2014 | Simpson | F01D 5/186 416/97 R |

\* cited by examiner

SHOWERHEAD HOLE SCHEME APPARATUS AND SYSTEM

CROSS-REFERENCE TO RELATED APPLICATIONS

This application is a nonprovisional of, and claims priority to, and the benefit of U.S. Provisional Application No. 62/037,955, entitled "SHOWERHEAD HOLE SCHEME APPARATUS AND SYSTEM," filed on Aug. 15, 2014, which is hereby incorporated by reference in its entirety.

GOVERNMENT LICENSE RIGHTS

This disclosure was made with government support under contract No. FA8650-09-D-2923-0021 awarded by the United States Air Force. The government has certain rights in the disclosure.

FIELD

The present disclosure relates generally to a gas turbine engine and more specifically to turbine blades and/or vanes exposed to high temperature.

BACKGROUND

A gas turbine engine may include a turbine section with multiple rows or stages of stator vanes and rotor blades that interact or react with a high temperature gas flow to create mechanical power. In a gas turbine engine, the turbine rotor blades drive the compressor and an electric generator to generate electrical power.

The efficiency of the engine can be increased by passing a higher temperature gas flow through the turbine. However, the turbine inlet temperature is limited to the vane and blade (airfoils) material properties and the cooling capabilities of these airfoils. The first stage airfoils are exposed to the highest temperature gas flow since these airfoils are located immediately downstream from the combustor. The temperature of the gas flow passing through the turbine progressively decreases as the rotor blade stages extract energy from the gas flow. The leading edge of the vane and blade airfoils is exposed to high temperature gas flow

SUMMARY

In various embodiments, a turbine showerhead cooling hole layout for a gas turbine component is disclosed. The turbine showerhead cooling hole layout may comprise a first pressure side/aft most row of radially disposed showerhead cooling holes, wherein the breakout of cooling holes of the first row comprise a greater deflection in a γ direction than in a δ direction. The turbine showerhead cooling hole layout may comprise a second row of radially disposed showerhead cooling holes, wherein the breakout of the cooling holes of the second row comprise about 0 to 5 degrees of deflection in the γ direction and the δ direction. The turbine showerhead cooling hole layout may comprise a fifth row (suction side/aft most) of radially disposed showerhead cooling holes, wherein the breakout of the cooling holes of the fifth row comprise a greater deflection in the δ direction than in the γ direction.

In various embodiments, a turbine showerhead cooling hole layout for a gas turbine component is disclosed. The turbine showerhead cooling hole layout may comprise a first outer row of radially disposed showerhead cooling holes. The turbine showerhead cooling hole layout may comprise a first interior row of radially disposed showerhead cooling holes. The turbine showerhead cooling hole layout may comprise a second outer row of radially disposed showerhead cooling holes. The breakouts of the holes of the first outer row of radially disposed showerhead cooling holes, the first interior row of radially disposed showerhead cooling holes and the a second outer row of radially disposed showerhead cooling holes may at least partially overlap along a lateral plane. The diffusion of the breakouts of the holes of the first outer row of radially disposed showerhead cooling holes, the first interior row of radially disposed showerhead cooling holes and the second outer row of radially disposed showerhead cooling holes may be directed away from adjacent rows.

In various embodiments, a turbine showerhead cooling hole layout for a gas turbine component is disclosed. The turbine showerhead cooling hole layout may comprise a first outer row of radially disposed showerhead cooling holes. The turbine showerhead cooling hole layout may comprise a second outer row of radially disposed showerhead cooling holes. Diffusion of the breakouts of the holes of the first outer row of radially disposed showerhead cooling holes and the second outer row of radially disposed showerhead cooling holes are directed laterally away from adjacent rows. Diffusion of the breakouts of the holes of the first outer row of radially disposed showerhead cooling holes and the second outer row of radially disposed showerhead cooling holes are minimized in the lateral direction towards adjacent rows.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
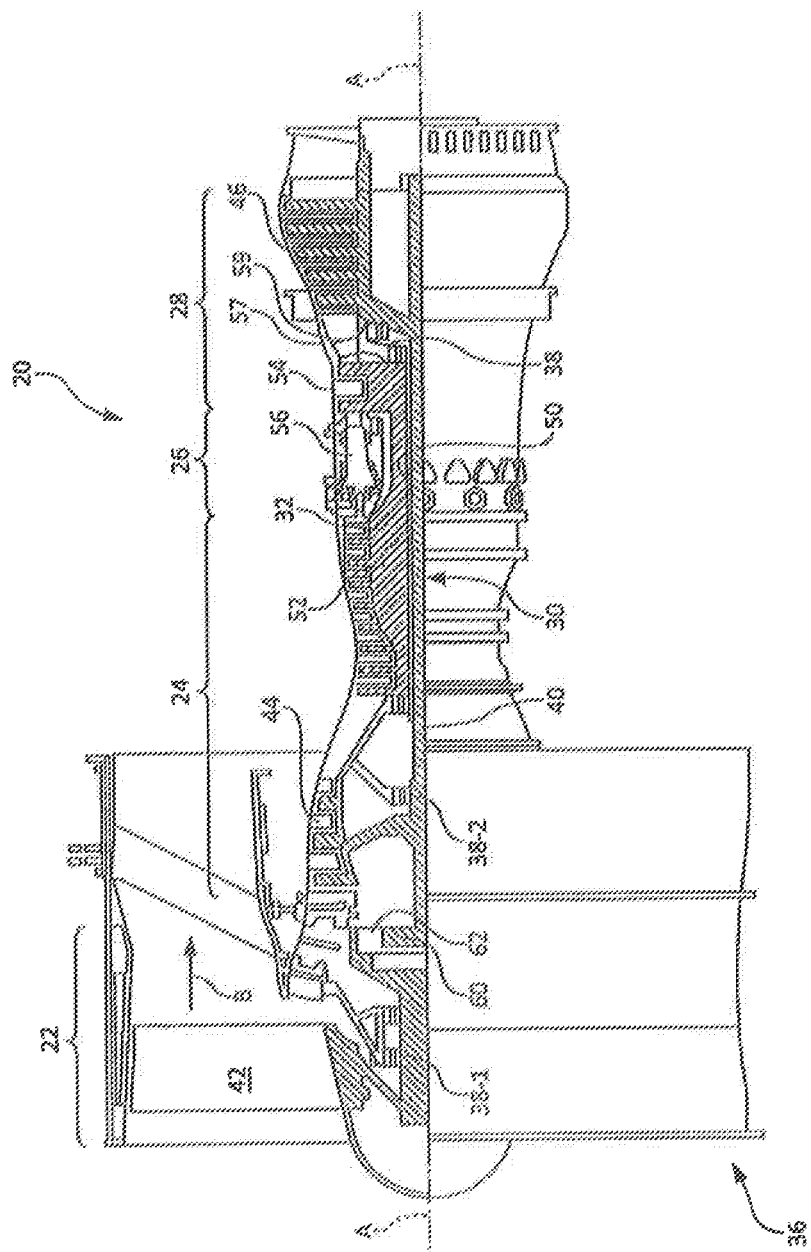
FIG. 1 illustrates cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 1). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which requires higher pressure ratios and higher temperatures in the HPC 52. These higher operating temperatures and pressure ratios may create operating environments that may cause thermal loads that are higher than the thermal loads which may shorten the endurance life of current components.

In various embodiments, HPC 52 may comprise alternating rows of rotating rotors and stationary stators. Stators may have a cantilevered configuration or a shrouded configuration. More specifically, stator may comprise a stator vane, a casing support and a hub support. In this regard, stator vane may be supported along an outer diameter by casing support and along an inner diameter hub support. In contrast, a cantilevered stator may comprise a stator vane that is only retained and/or supported at the casing (e.g., an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2:
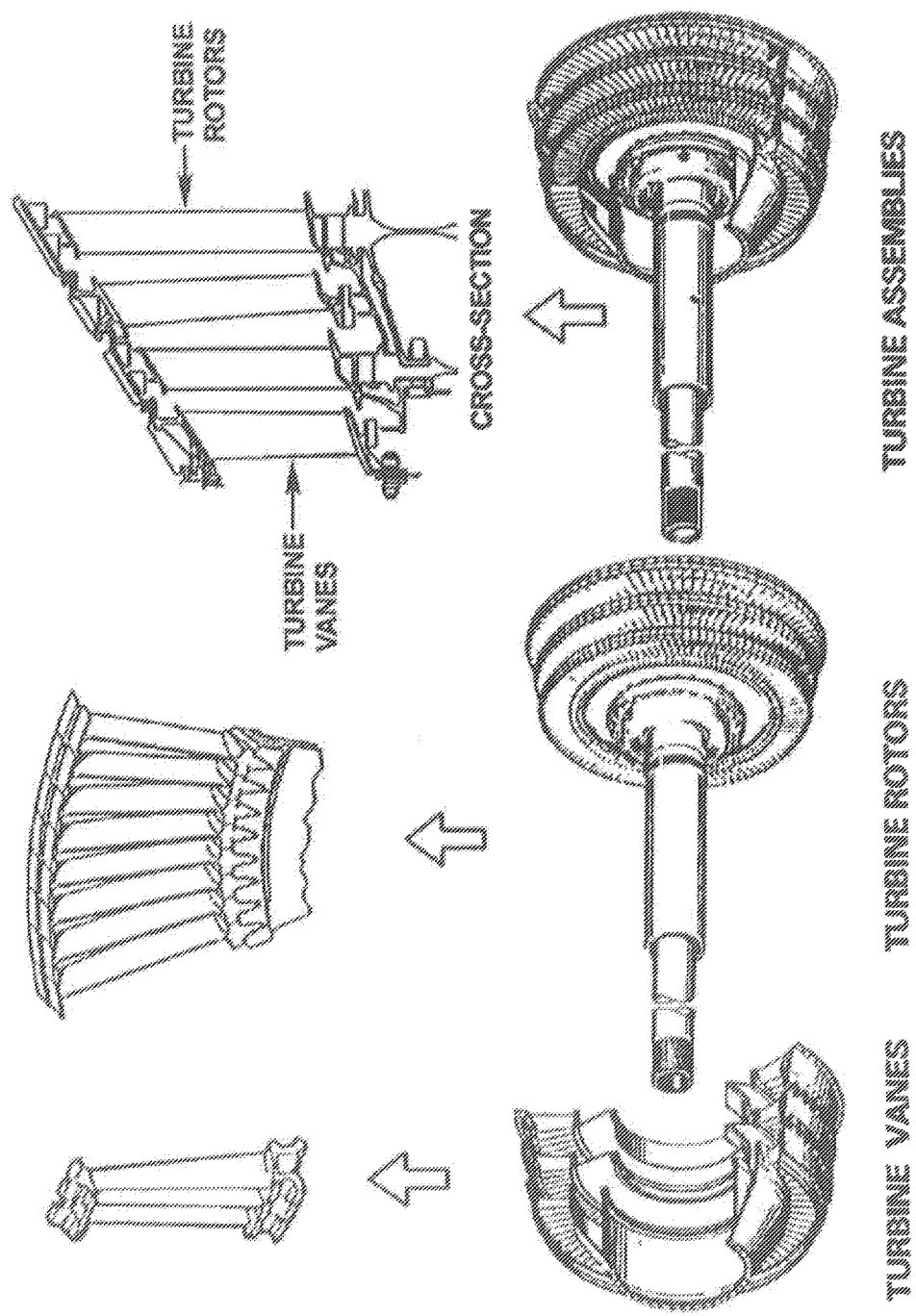
FIG. 2 illustrates a perspective view of turbine components in accordance with various embodiments.

Operating conditions in the aft stages of HPC 52 may be approximately 1400° F. (approximately 760° C.) or more. As noted above and with reference to FIG. 2, turbine blades and vanes are subject to a high external heat load that is very localized to the stagnation location which is where the hot combustion gases impinge on the airfoil. The showerhead region includes a hole located at a stagnation location along the leading edge of the blade, which is the location where the hot gas flow directly hits the airfoil. The showerhead region is prone to high cycle fatigue (HCF) failure which is typically directly dependent on the local metal temperature near the cooling holes. Showerhead cooling holes are cooling holes, often machined into a leading edge configured to at least partially offset that external high heat load.

According to various embodiments, the systems and apparatus disclosed herein are configured to reduce the local temperature around the showerhead cooling holes. This may increase the high cycle fatigue life of the associated parts.

Figure 3:
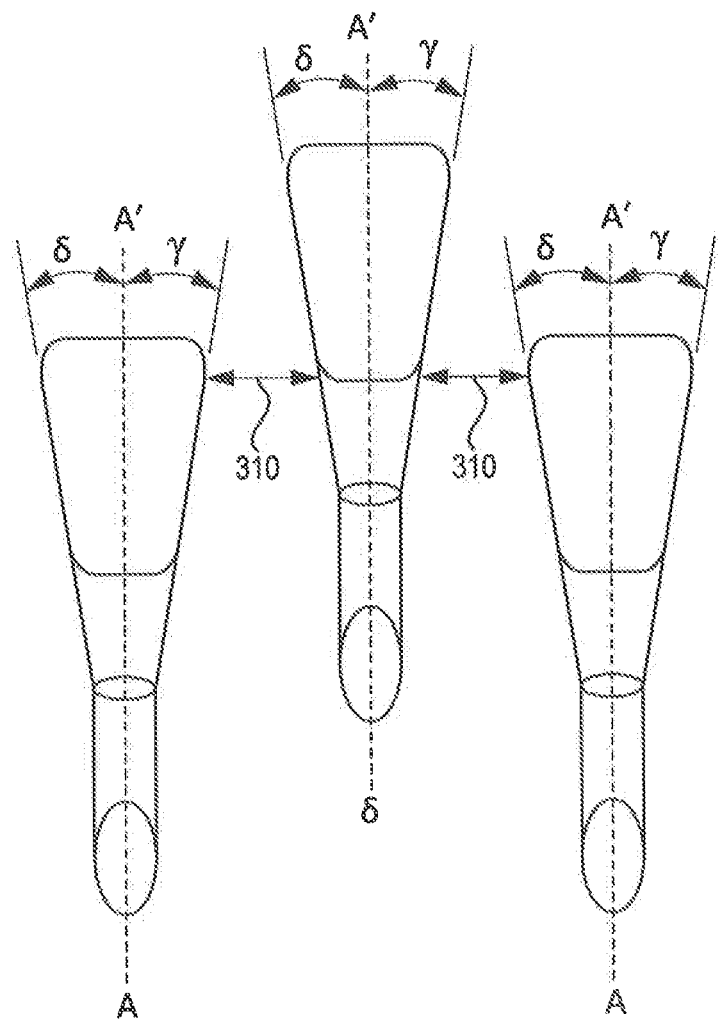
FIG. 3 illustrates a cross-sectional view of a prior art layout of showerhead cooling holes.

Historically, with reference to prior art FIG. 3, a row of showerhead cooling holes, three across, comprising diffusion angles of their breakout shape along both the external surface in the delta "δ" and gamma "γ" directions away from a center line A-A' are depicted. A minimum ligament distance span 310 may be maintained between adjacent showerhead cooling holes. Maintaining the minimum ligament distance span 310 tends to reduce cracking on the turbine blades and vanes.

Figure 4:
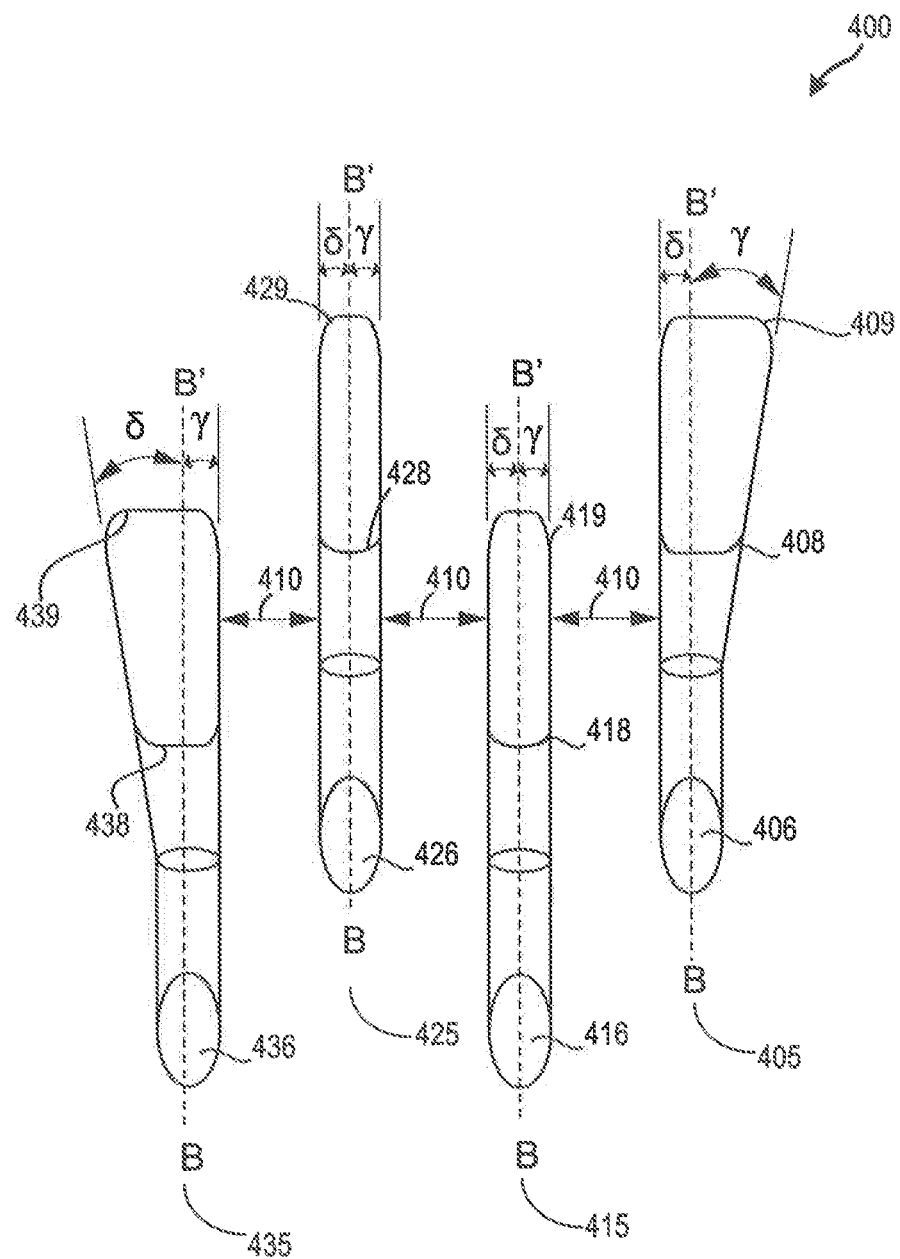
FIG. 4 illustrates a cross-sectional view of a tightly packed high coverage showerhead hole scheme in accordance with various embodiments.

According to various embodiments and with reference to FIG. 4, a tightly packed high coverage showerhead hole layout 400 depicting an adjusted breakout shape of the showerhead cooling holes configured to increase the density of cooling hole coverage across the turbine blades and vanes in a stagnation location. For instance, a first row 405 of showerhead cooling holes may span in a radial direction of a blades and/or vanes and each showerhead cooling hole 406 may comprise a breakout shape with a diffusion angle that is greater in the γ direction than in the δ direction. For instance, the diffusion angle from a centerline B-B' in the γ direction may be from about 8 to about 15 degrees while the diffusion of the hole in the δ direction may be between about 0 and about 5 degrees. A second row 415 of showerhead cooling holes spanning a radial direction of a blades and/or a vane may comprise a breakout shape with a diffusion angle that is substantially equivalent in the γ direction and in the δ direction. For instance, the diffusion angle from a centerline B-B' of showerhead cooling hole 416 in the γ direction may be from about 0 to about 5 degrees and the diffusion angle of the breakout of showerhead cooling hole 416 in the δ direction may be between about 0 and about 5 degrees.

A third row 425 of showerhead cooling holes spanning a radial direction of a blades and/or a vane may comprise a breakout shape with a diffusion angle that is substantially equivalent in the γ direction and in the δ direction. For instance, the diffusion angle from a centerline B-B' of showerhead cooling hole 426 in the γ direction may be from about 0 to about 5 degrees and the diffusion angle of a breakout of showerhead cooling hole 426 in the δ direction may be between about 0 and about 5 degrees.

The showerhead cooling holes 416, 426 of second row 415 and third row 425, respectively, have minimum deflection angles in the δ direction and in the γ direction (e.g., in lateral directions). A minimum deflection angle as used herein may be between about 5 and 0 degrees.

For instance, a forth row 435 of showerhead cooling holes 436 may span in a radial direction of a blades and/or vanes and each showerhead cooling hole 436 may comprise a breakout shape with a diffusion angle that is greater in the δ direction than in the γ direction. For instance, the diffusion angle from a centerline B-B' in the δ direction may be from about 8 to about 15 degrees while the diffusion of the hole in the γ direction may be between about 0 and about 5 degrees.

Row 405 may be spaced a minimum ligament distance span 410 from second row 415. Second row 415 may be spaced a minimum ligament distance span 410 from both third row 425 and fourth row 435. Third row 425 may be spaced a minimum ligament distance span 410 from fourth row 435 and second row 415. The forward edge 408 of the breakout opening of showerhead cooling hole 406 may be offset from forward edge 418 of the breakout opening of showerhead cooling hole 416. The forward edge 408 of the breakout opening of showerhead cooling hole 406 may be substantially in the same axial alignment with a forward edge 428 of the breakout opening of showerhead cooling hole 426.

The forward edge 418 of the breakout opening of showerhead cooling hole 416 may be offset from forward edge 428 of the breakout opening of showerhead cooling hole 426. The forward edge 418 of the breakout opening of showerhead cooling hole 416 may be substantially in the same axial alignment with a forward edge 438 of the breakout opening of showerhead cooling hole 436.

The trailing edge 409 of the breakout opening of showerhead cooling hole 406 may be offset from trailing edge 419 of the breakout opening of showerhead cooling hole 416. The trailing edge 409 of the breakout opening of showerhead cooling hole 406 may be substantially in the same axial alignment with a trailing edge 429 of the breakout opening of showerhead cooling hole 426.

The trailing edge 419 of the breakout opening of showerhead cooling hole 416 may be offset from a trailing edge 429 of the breakout opening of showerhead cooling hole 426. The trailing edge 419 of the breakout opening of showerhead cooling hole 416 may be substantially in the same axial alignment with a trailing edge 439 of the breakout opening of showerhead cooling hole 436.

Showerhead cooling hole 426 and showerhead cooling hole 416 may comprise substantially equivalent breakout shapes. Showerhead cooling hole 426 and showerhead cooling hole 416 may comprise substantially equivalent breakout shapes. Showerhead cooling hole 436 and showerhead cooling hole 406 may comprise substantially mirror image breakout shapes.

Figure 5:
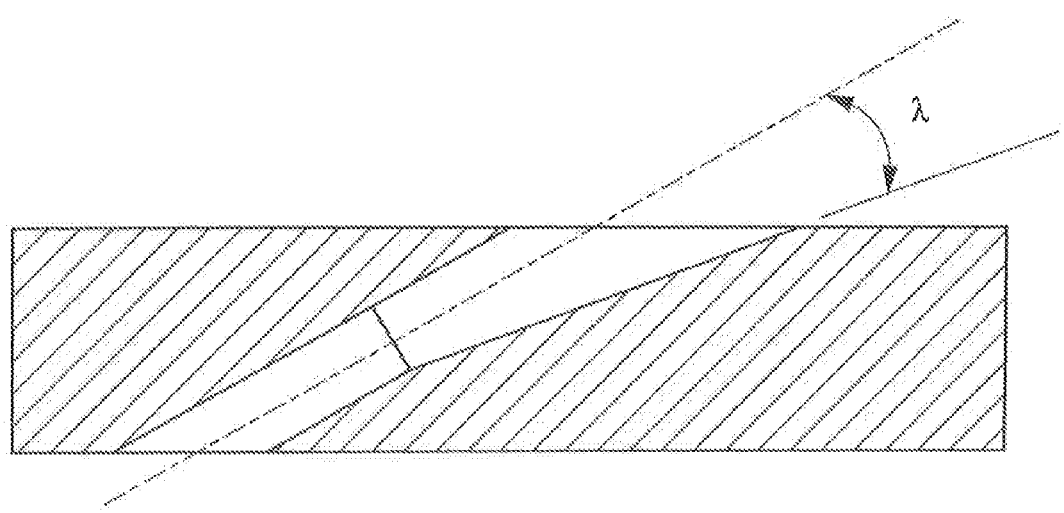
FIG. 5 illustrates a cross-sectional view of breakout of the diffusion into the surface of the holes of the tightly packed high coverage showerhead hole scheme of FIG. 4 in accordance with various embodiments.

According to various embodiments and with reference to FIG. 5, showerhead cooling holes 406, 416, 426, and 426 may each comprise a substantially equivalent diffusion angle lambda λ into the surface. For instance, diffusion angle λ in the direction of the surface may be between about 8 and 15 degrees for each of showerhead cooling holes 406, 416, 426, and 426.

Due to the varied breakout shapes of rows 405, 415, 425 and 435 the rows may be located closer together than prior art techniques (See FIG. 3). Closer packed rows yields additional total showerhead cooling hole density over an area. This may reduce the temperature of a zone of interest, such as a leading edge of a turbine blades and/or vanes. For instance, over 100 degrees of local temperature reduction proximate to the stagnation zone may be achieved utilizing the designs described herein.

According to various embodiments showerhead cooling hole coverage is increased as compared to traditional designs. Coverage as used herein may take into account a breakout of the hole, a pitch of the hole, and the locations of adjacent holes. Maximizing coverage increases the ability to achieve a cooling film on the external surface of the blade and/or vane.

Figure 6:
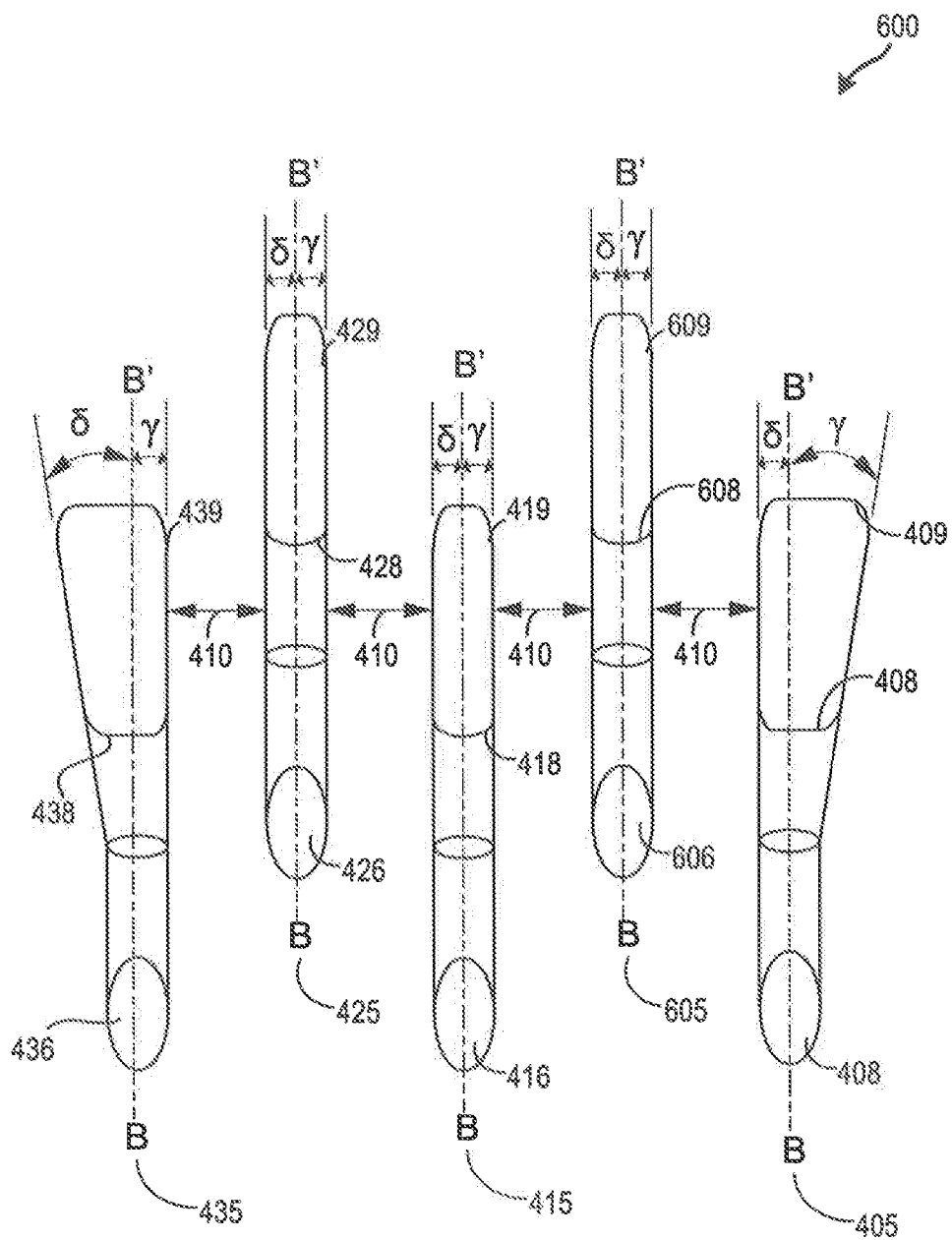
FIG. 6 illustrates a cross-sectional view of a tightly packed high coverage showerhead hole scheme in accordance with various embodiments.

According to various embodiments and with reference to FIG. 6, a layout 600 of 5 rows across is depicted. The geometry of the holes of layout 600 is similar the geometry of the holes of tightly packed high coverage showerhead hole layout 400 with an additional row 605 of holes between row 405 and second row 415. Row 605 alters the offset of row 405. As depicted in FIG. 6, row 405 may be spaced a minimum ligament distance span 410 from additional row 605. Additional row 605 may be spaced a minimum ligament distance span 410 from both row 405 and second row 415.

The forward edge 408 of the breakout opening of showerhead cooling hole 405 may be offset from forward edge 608 of the breakout opening of showerhead cooling hole 605. The forward edge 408 of the breakout opening of showerhead cooling hole 405 may be substantially in the same axial alignment with a forward edge 418 of the breakout opening of showerhead cooling hole 416.

The trailing edge 609 of the breakout opening of showerhead cooling hole 606 may be offset from trailing edge 419 of the breakout opening of showerhead cooling hole 416. The trailing edge 609 of the breakout opening of showerhead cooling hole 606 may be substantially in the same axial alignment with a trailing edge 429 of the breakout opening of showerhead cooling hole 426.

Figure 7:
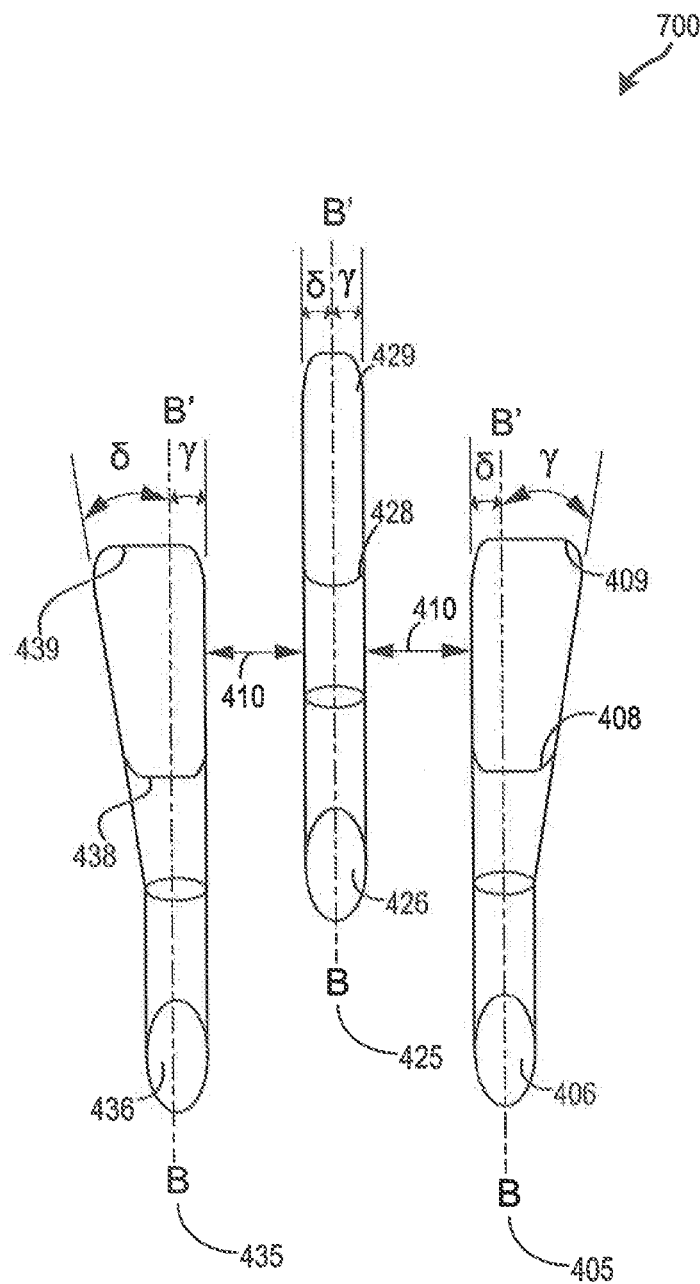
FIG. 7 illustrates a cross-sectional view of a tightly packed high coverage showerhead hole scheme in accordance with various embodiments.

According to various embodiments and with reference to FIG. 7, a layout 700 of 3 rows across is depicted. The geometry of the holes of layout 700 is similar the geometry of the holes of layout 600 with additional row 605 and second row 415 removed.

Figure 8:
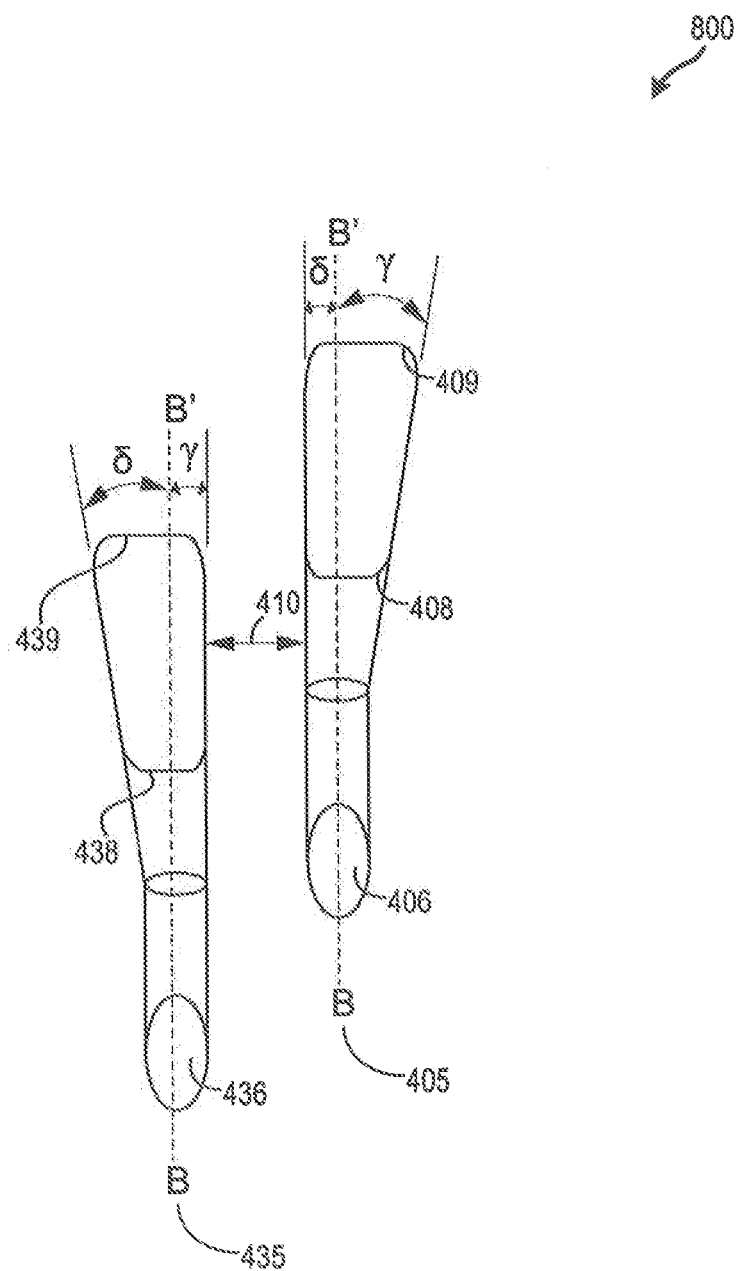
FIG. 8 illustrates a cross-sectional view of a tightly packed high coverage showerhead hole scheme in accordance with various embodiments.

According to various embodiments and with reference to FIG. 8, a layout 800 of 2 rows across is depicted. The geometry of the holes of layout 800 is similar the geometry of the holes of tightly packed high coverage showerhead hole layout 400 with second row 415, and 425 removed.

According to various embodiments the rows of holes may not span the entire radial span of a vane and/or a blade. For instance the radial span of one or more rows may be a partial span. The radial span may be between 0-50% of the radial direction of the blade or vane. The geometry of the shape of a breakout of holes in a row along a radial span of holes. For instance, towards the distal end (e.g., away from an attachment surface) of a row in the radial direction a row of holes may comprise a conventional breakout shape, similar to the geometries depicted in FIG. 1, and then vary to one of the hole breakout geometries depicted in FIG. 4, and/or FIGS. 6-8.

According to various embodiments, the cooling holes described herein (e.g., showerhead cooling holes 406, 416, 426, 436, 606) satisfy minimum ligament spans that ensure a minimum distance exits between any part of one cooling hole and any part of the neighboring and/or adjacent cooling hole. This minimum ligament span limits how close the cooling holes are placed to one another. The internal cooling hole convection or "hA" in the cooling hole typically dominates the cooling of the showerhead region. Since the internal hole convection dominates, placing the cooling holes closer together is a powerful method to reduce the local metal temperature.

According to various embodiments, showerhead cooling hole layouts described herein include minimal lateral cooling hole exit diffusion on the middle showerhead cooling hole rows and interior facing sides of outside rows. In this way, rows of cooling holes may be placed close together. Stated another way, the outer showerhead cooling hole rows substantially only include lateral cooling hole exit diffusion in the direction away from the other rows to again allow the rows to be placed as close together as possible.

Local metal temperature is reduced by packing the showerhead hole rows close together, which maximizes the local cooling ability. The diffusion of the shaped cooling holes is catered to pack a very dense array of cooling holes into a small area near the stagnation zone. These cooling holes maintain very large footprints which increase the coverage in an effort to maximize the film cooling as well.

Figure 9A:
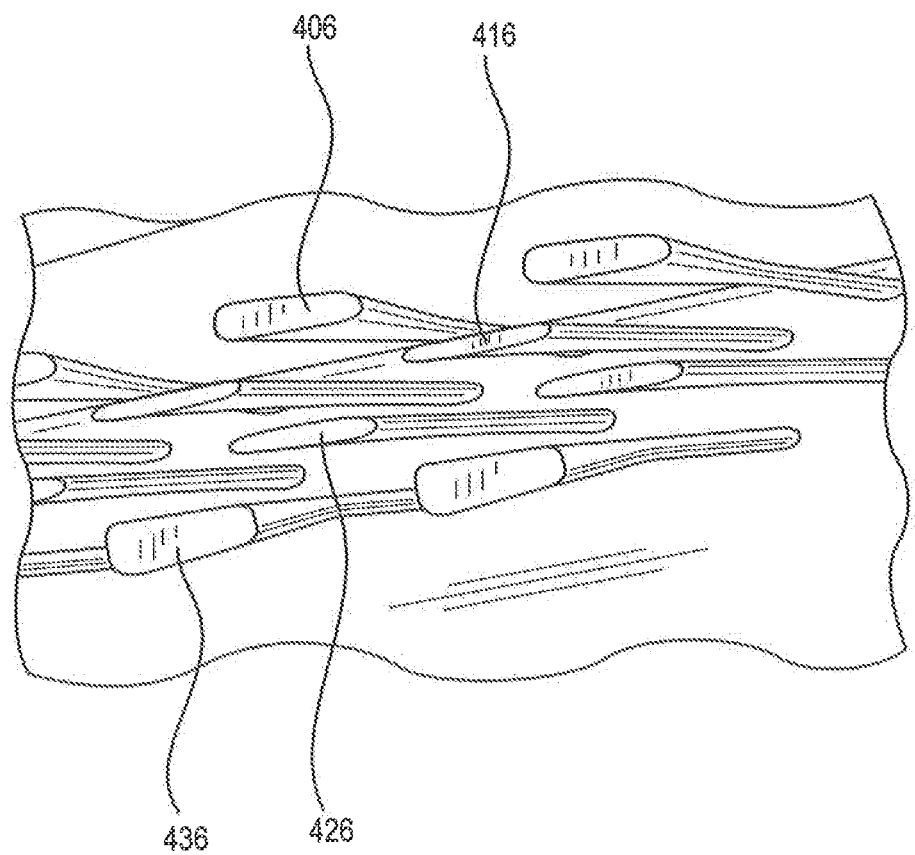
FIGS. 9A-9C illustrate isometric views of the tightly packed high coverage showerhead hole scheme of FIG. 4 in accordance with various embodiments.
Figure 9B:
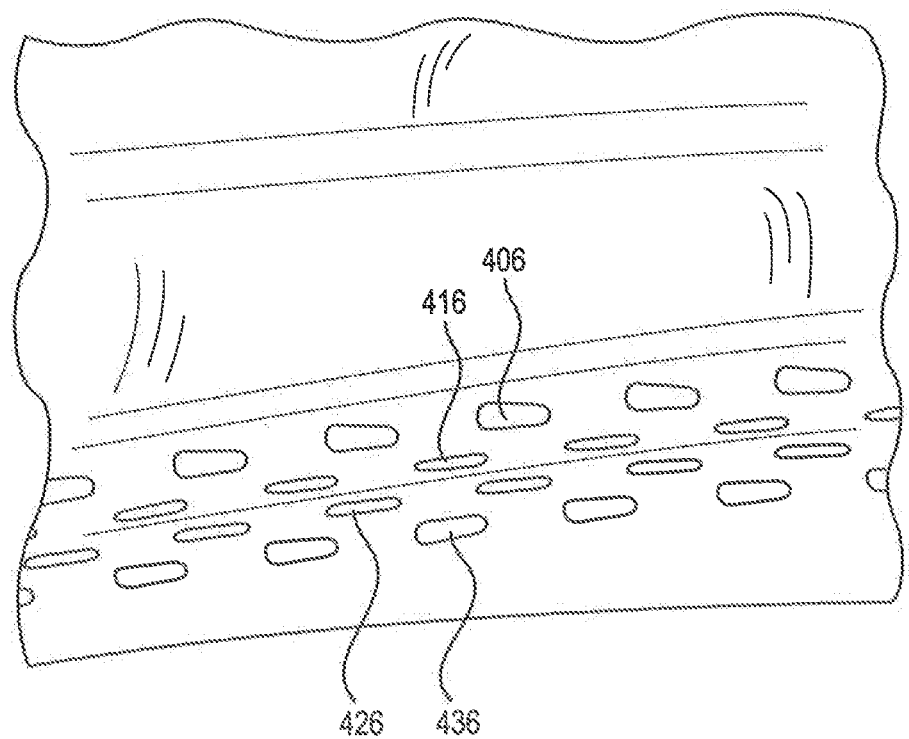
Figure 9C:
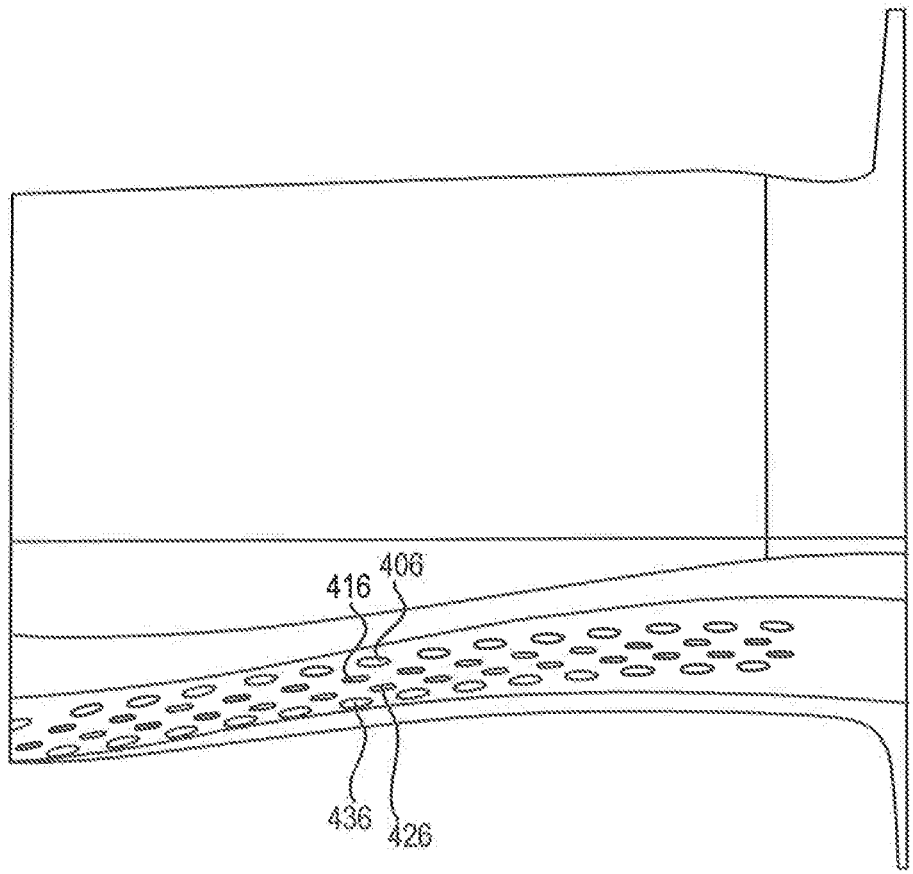

The technology disclosed herein implements a cooling hole scheme that can locally counteract the external heat load in a highly efficient manner. FIGS. 9A-9C illustrate isometric views of the tightly packed high coverage showerhead hole layout 400 (see FIG. 4) in accordance with various embodiments.

Cooling air may be ejected from the cooling holes, such as showerhead cooling holes 406, 416, 426, 436, described herein. The cooling holes may be configured to produce a layer of cooling air that flows over the leading edge surface to protect the metal surface from too much exposure to the high temperature hot gas flow. The cooling air may be ejected in a radial direction of the blade or vane. A portion of the cooling air will thus migrate onto the leading edge surface of the blade or vane to provide a layer of cooling air.

Benefits, other advantages and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine component having a showerhead cooling hole layout, comprising:
    a pressure side row of radially disposed showerhead cooling holes, wherein a breakout of the pressure side row of radially disposed showerhead cooling holes comprise a greater deflection in a $\gamma$ direction than in a $\delta$ direction, where $\gamma$ and $\delta$ are lateral directions;
    a second row of radially disposed showerhead cooling holes, wherein a breakout of the second row of radially disposed showerhead cooling holes comprise about 0 to 5 degrees of deflection in the $\gamma$ direction and the $\delta$ direction;
    a suction side row of radially disposed showerhead cooling holes, wherein a breakout of the aft most row of radially disposed showerhead cooling holes comprise a greater deflection in the $\delta$ direction than in the $\gamma$ direction;
    a third row of radially disposed showerhead cooling holes, wherein a breakout of the third row of radially disposed showerhead cooling holes comprise 0 to 5 degrees of deflection in at least either the $\gamma$ direction or the $\delta$ direction; and
    a fourth row of radially disposed showerhead cooling holes, wherein a breakout of the fourth row of radially disposed showerhead cooling holes comprise 0 to 5 degrees of deflection in at least either the $\gamma$ direction or the $\delta$ direction, wherein the breakout of the pressure side row of radially disposed showerhead cooling holes and the breakout of the suction side row of radially disposed showerhead cooling holes include lateral cooling hole exit diffusion in the direction away from other rows.

2. The gas turbine component having the showerhead cooling hole layout of claim 1, wherein the turbine showerhead cooling hole layout is disposed on a leading edge of at least one of turbine blade or a turbine vane.

3. The gas turbine component having the showerhead cooling hole layout of claim 1, wherein a minimum ligament distance which limiting how close showerhead cooling holes are placed to one another exits between any part of a radially disposed showerhead cooling hole and any part of a neighboring radially disposed showerhead cooling hole.

4. The gas turbine component having the showerhead cooling hole layout of claim 1, wherein a diffusion angle of the breakout of the pressure side row of radially disposed showerhead cooling holes from a centerline in the $\gamma$ direction is from about 8 to about 15 degrees, wherein a diffusion angle of the breakout of the pressure side row of radially disposed showerhead cooling holes in the $\delta$ direction is between about 0 and about 5 degrees.

5. The gas turbine component having the showerhead cooling hole layout of claim 1, wherein a diffusion angle of the breakout of the suction side row of radially disposed showerhead cooling holes from a centerline in the $\delta$ direction is from about 8 to about 15 degrees, wherein a diffusion angle of the breakout of the pressure side row of radially disposed showerhead cooling holes in the $\gamma$ direction is between about 0 and about 5 degrees.

6. The gas turbine component having the showerhead cooling hole layout of claim 1, wherein a geometry of the breakout of the pressure side row of radially disposed showerhead cooling holes and a geometry of the breakout of the suction side row of radially disposed showerhead cooling holes are mirror images.

7. The gas turbine component having the showerhead cooling hole layout of claim 1, wherein a geometry of the breakout of the pressure side row of radially disposed showerhead cooling holes, a geometry of the breakout of the second row of radially disposed showerhead cooling holes and a geometry of the breakout of the suction side row of radially disposed showerhead cooling holes comprise a substantially equivalent diffusion in a $\lambda$ direction.

8. The gas turbine component having the showerhead cooling hole layout of claim 1, wherein a forward edge of the breakout of the pressure side row of radially disposed showerhead cooling holes is offset from a forward edge of the breakout of a radially disposed showerhead cooling hole of an adjacent row.

9. The gas turbine component having the showerhead cooling hole layout of claim 1, wherein a trailing edge of the breakout of the pressure side row of radially disposed showerhead cooling holes is offset from a trailing edge of the breakout of a radially disposed showerhead cooling hole of an adjacent row.

10. The gas turbine component having the showerhead cooling hole layout of claim 1, wherein a forward edge of the breakout of the pressures side row of radially disposed showerhead cooling holes is substantially in lateral alignment with a forward edge of the breakout of the an aft most row of radially disposed showerhead cooling holes.

11. The gas turbine component having the showerhead cooling hole layout of claim 1, wherein a trailing edge of the breakout of the pressures side row of radially disposed showerhead cooling holes is substantially in lateral alignment with a trailing edge of the breakout of the suction side row of radially disposed showerhead cooling holes.

12. The gas turbine component having the showerhead cooling hole layout of claim 1, wherein at least one of the pressure side row of radially disposed showerhead cooling holes, the second row of radially disposed showerhead cooling holes, or the third row of radially disposed showerhead cooling holes, span a partial length of a full length of at least one of a blade or a vane of a turbine.

13. A gas turbine component having a showerhead cooling hole layout, comprising:
   a first outer row of radially disposed showerhead cooling holes;
   a first interior row of radially disposed showerhead cooling holes;
   a second outer row of radially disposed showerhead cooling holes, wherein a breakout of the first outer row of radially disposed showerhead cooling holes, the first interior row of radially disposed showerhead cooling holes and the second outer row of radially disposed showerhead cooling holes, at least partially overlap along a lateral plane, and wherein a first outer row diffusion angle of the breakout of the first outer row of radially disposed showerhead cooling holes, a first interior row diffusion angle of the breakout of the first interior row of radially disposed showerhead cooling holes and a second outer row diffusion angle of the breakout of the second outer row of radially disposed showerhead cooling holes are directed away from adjacent rows; and
   a fourth row of radially disposed showerhead cooling holes, wherein a breakout of the fourth row of radially disposed showerhead cooling holes comprise 0 to 5 degrees of deflection in at least either the γ direction or the δ direction, wherein the breakout of the first outer row of radially disposed showerhead cooling holes, the breakout of the first interior row of radially disposed showerhead cooling holes and the breakout of the second outer row of radially disposed showerhead cooling holes include lateral cooling hole exit diffusion in a direction away from other rows, and wherein a diffusion angle is between 8 to 15 degrees.

14. The gas turbine component having the showerhead cooling hole layout of claim 13, wherein a geometry of the breakout of the first outer row of radially disposed showerhead cooling holes, the first interior row of radially disposed showerhead cooling holes and the second outer row of radially disposed showerhead cooling holes comprise a substantially equivalent diffusion in a λ direction.

15. A gas turbine component having a showerhead cooling hole layout, comprising:
   a first outer row of radially disposed showerhead cooling holes; and
   a second outer row of radially disposed showerhead cooling holes, wherein a diffusion angle of a breakout of the first outer row of radially disposed showerhead cooling holes and a diffusion angle of a breakout of the second outer row of radially disposed showerhead cooling holes are directed laterally away from adjacent rows, wherein the diffusion angle of the breakout of the first outer row of radially disposed showerhead cooling holes and the diffusion angle of the breakout of the second outer row of radially disposed showerhead cooling holes comprise 0 to 5 degrees of deflection towards adjacent rows;
   a third row of radially disposed showerhead cooling holes, wherein a breakout of the third row of radially disposed showerhead cooling holes comprise 0 to 5 degrees of deflection in at least either the γ direction or the δ direction; and
   a fourth row of radially disposed showerhead cooling holes, wherein a breakout of the fourth row of radially disposed showerhead cooling holes comprise 0 to 5 degrees of deflection in at least either the γ direction or the δ direction, wherein the breakout of the first outer row of radially disposed showerhead cooling holes and the breakout of the second outer row of radially disposed showerhead cooling holes include lateral cooling hole exit diffusion in the direction away from other rows, wherein at least two of the first outer row, the second outer row, the third row and the forth row of radially disposed showerhead cooling holes are oriented substantially parallel to each other.

\* \* \* \* \*